(12) United States Patent
Azazi et al.

(10) Patent No.: US 10,307,913 B2
(45) Date of Patent: Jun. 4, 2019

(54) ROBOTIC GRIPPER

(71) Applicant: Control & Power Systems, Inc., Fairfield, NJ (US)

(72) Inventors: Bryan Azazi, Pine Brook, NJ (US); Carmin K. Ezzo, Pequannock, NJ (US)

(73) Assignee: Control & Power Systems, Inc., Fairfield, NJ (US)

( * ) Notice: Subject to any disclaimer, the term of this patent is extended or adjusted under 35 U.S.C. 154(b) by 0 days.

(21) Appl. No.: 16/032,307

(22) Filed: Jul. 11, 2018

(65) Prior Publication Data

US 2019/0030711 A1 Jan. 31, 2019

Related U.S. Application Data

(60) Provisional application No. 62/537,537, filed on Jul. 27, 2017.

(51) Int. Cl.
| | |
|---|---|
| *B25J 15/12* | (2006.01) |
| *B25J 15/02* | (2006.01) |
| *B25J 15/10* | (2006.01) |
| *B25J 9/14* | (2006.01) |
| *B25J 9/00* | (2006.01) |

(52) U.S. Cl.
CPC ............ *B25J 15/12* (2013.01); *B25J 9/0027* (2013.01); *B25J 9/144* (2013.01); *B25J 15/024* (2013.01); *B25J 15/10* (2013.01)

(58) Field of Classification Search
CPC . B25J 15/02; B25J 15/024; B25J 15/10; B25J 15/103; B25J 15/12; B25J 9/0027; B25J 9/144

USPC .......................... 294/100, 196, 202
See application file for complete search history.

(56) References Cited

U.S. PATENT DOCUMENTS

| | | | | | |
|---|---|---|---|---|---|
| 1,053,730 | A | * | 2/1913 | Jensen ..................... | A01C 5/02 111/106 |
| 1,375,580 | A | * | 4/1921 | Fisher ...................... | A47J 45/10 294/33 |
| 2,792,253 | A | * | 5/1957 | Bliss ........................ | B65B 23/08 294/100 |
| 3,850,286 | A | * | 11/1974 | Tobin, Jr. ................ | A01C 1/046 198/443 |
| 4,540,211 | A | * | 9/1985 | Masserang ............. | B25J 15/103 294/115 |

(Continued)

*Primary Examiner* — Dean J Kramer
(74) *Attorney, Agent, or Firm* — Bodner & O'Rourke, LLP; Gerald T. Bodner; Christian P. Bodner

(57) ABSTRACT

A robotic gripper for grasping a target object includes a linear actuator and a gripping assembly. The gripping assembly is coupled to the linear actuator and includes a plurality of fingers that are positioned to selectively grasp and release the target object. The linear actuator includes an air cylinder and a linearly movable rod that reciprocates within the air cylinder between a retracted position and an extended position. The gripping assembly includes a finger holder and a finger closer. The fingers are affixed to the finger holder and extend from the finger holder through openings formed in the finger closer. The finger closer is coupled to the linearly movable rod which reciprocatingly drives the finger closer over the fingers to adjust the fingers between a first position in which the fingers grasp the target object and a second position in which the fingers release the target object.

13 Claims, 3 Drawing Sheets

(56) References Cited

U.S. PATENT DOCUMENTS

| | | | | |
|---|---|---|---|---|
| 4,671,553 | A | * | 6/1987 | Bertini .................... B25B 5/061 294/100 |
| 4,828,309 | A | * | 5/1989 | Germaine .............. B65G 47/90 294/100 |
| 5,120,099 | A | * | 6/1992 | Fletcher ................. A63B 47/02 114/312 |
| 5,121,955 | A | * | 6/1992 | Visser .................... A01G 9/086 111/104 |
| 5,295,723 | A | * | 3/1994 | Kronseder .............. B65B 21/12 294/100 |
| 5,895,084 | A | * | 4/1999 | Mauro ...................... B25J 7/00 294/100 |
| 6,935,666 | B2 | * | 8/2005 | Muramatsu ............... B25B 9/00 294/86.4 |

\* cited by examiner

ROBOTIC GRIPPER

CROSS-REFERENCE TO RELATED APPLICATIONS

This application is related to U.S. Provisional Patent Application Ser. No. 62/537,537, filed on Jul. 27, 2017, and entitled "Robotic Gripper", the disclosure of which is hereby incorporated by reference and on which priority is hereby claimed.

BACKGROUND OF THE INVENTION

Field of the Invention

The present invention generally relates to robotic tools, and more particularly relates to robotically operated gripping tools.

Description of the Prior Art

Product manufacturing is often implemented by automated assembly lines that incorporate robotics and conveyor belt systems. Multi-axis robots, such as ADEPT™ and SCARA™ type robotic platforms, interact with conveyor belt systems to assemble products from a variety of supplied components. Robotic systems typically include at least one working arm that is engageable with a plurality of assembly tools, some of which may be pneumatically operated. For example, screwdrivers and product manipulators can be robotically operated through the use of pneumatics.

As with any machine or tool, moving parts are subject to wear and, therefore, the components of various robotic tools require frequent replacement and adjustment. Furthermore, robotic tools are commonly engineered to accommodate a specific component. Accordingly, some robotic tools are part-specific and may not be used for a plurality of assembly components.

OBJECTS AND SUMMARY OF THE INVENTION

It is an object of the present invention to provide a robotic tool for gripping target objects.

It is another object of the present invention to provide a robotic tool for gripping target objects that is pneumatically operated by a robotic system.

It is yet a further object of the present invention to provide a robotic tool for gripping target objects that has minimal moving parts.

In accordance with one form of the present invention, a pneumatically operated robotic gripping device is provided. The device includes a linear actuator and gripping assembly. The gripping assembly includes a plurality of resilient fingers situated at least partially within a finger holder that are selectively configurable between a closed position and an open position to grasp and release target objects, respectively. The linear actuator includes an air cylinder and a rod that reciprocates therein. The rod is mechanically coupled to a finger closer having a plurality of openings through which the fingers extend. The linear actuator drives the rod so that the finger closer pulls the resilient fingers inwardly, against the bias of the fingers, to grasp a target object situated between the free ends of the fingers. The gripper and target object held therein are moved by the robotic system to a desired destination location. The target object is released at the desired destination location by applying opposite pneumatic force to the linear actuator so that the finger closer is retracted towards the air cylinder and the resilient fingers return to their natural shape and position, thereby releasing the target object therefrom.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figures 1, 2:
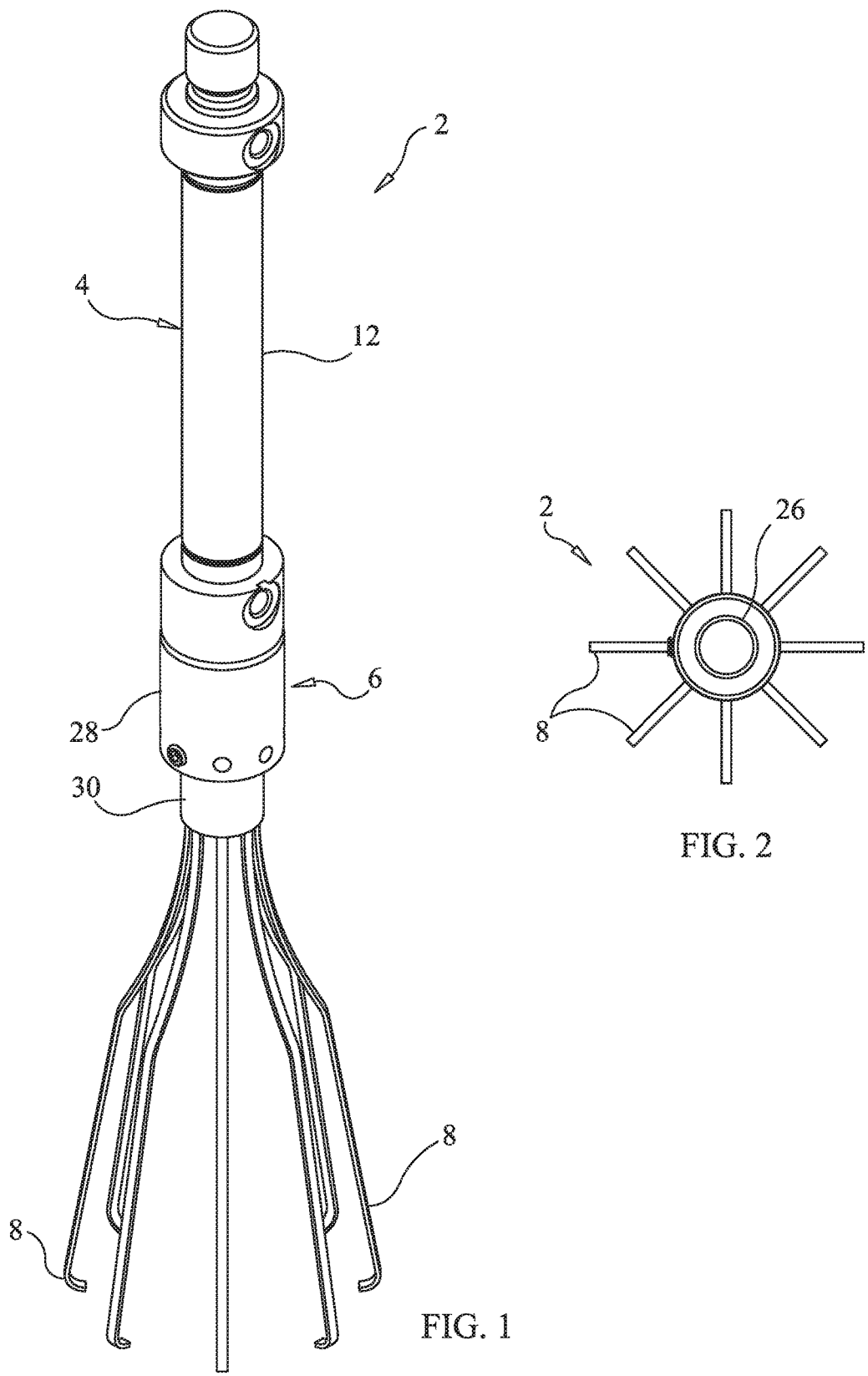
FIG. 1 is a front perspective view of the robotic gripper formed in accordance with the present invention, showing the gripper in the open position.
FIG. 2 is a top plan view of the robotic gripper formed in accordance with the present invention.
Figure 3:
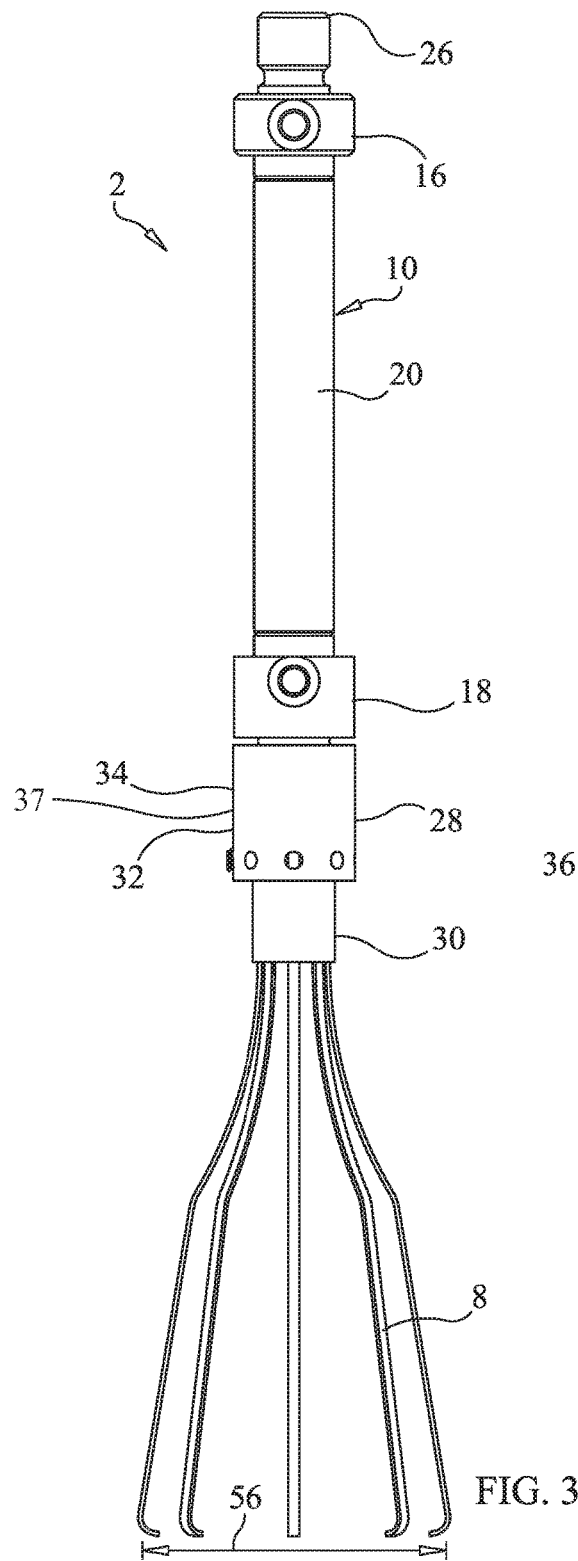
FIG. 3 is a side elevational view of the robotic gripper formed in accordance with the present invention, showing the gripper in the open position.
Figure 4:
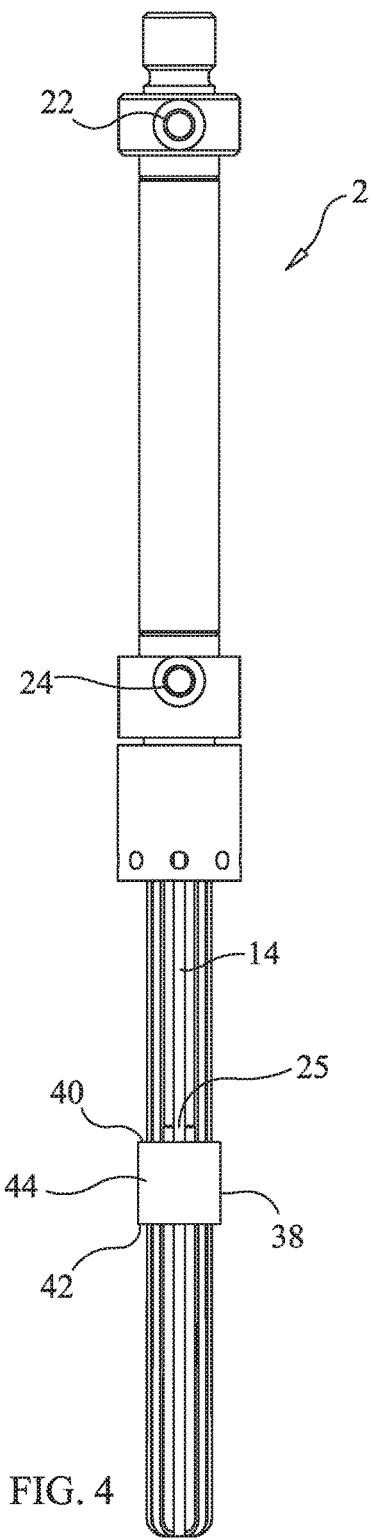
FIG. 4 is a side elevational view of the robotic gripper formed in accordance with the present invention, showing the gripper in the closed position.
Figure 5:
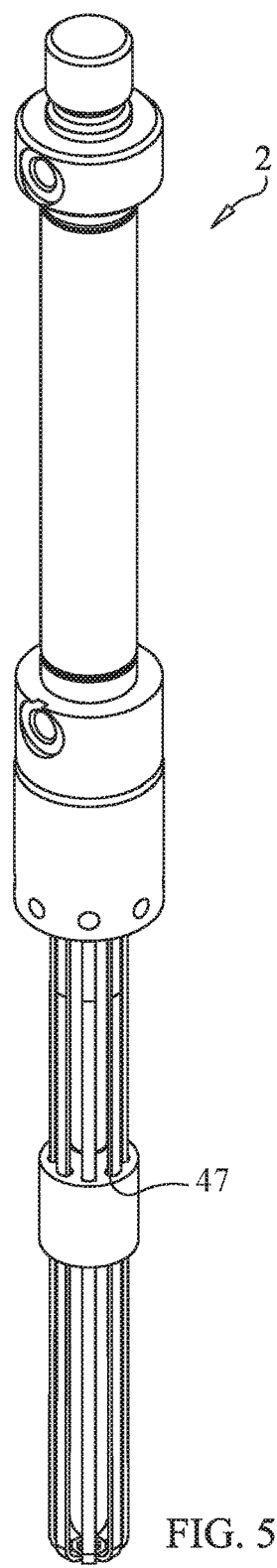
FIG. 5 is a front perspective view of the robotic gripper formed in accordance with the present invention, showing the gripper in the closed position.

Reference should initially be made to FIG. 1 of the drawings, where it can be seen that a robotic gripper 2 for grasping target objects (e.g., components or materials) formed in accordance with the present invention includes a linear actuator 4 and a gripping assembly 6 mechanically coupled thereto. The gripping assembly 6 preferably includes a plurality (preferably, eight) of resilient wire fingers 8. The resilient fingers 8 are selectively adjustable between a closed position, as shown in FIGS. 4 and 5 of the drawings, and an open position, as shown in FIGS. 1, 2, 3 and 6 of the drawings, to grasp and release the target object, respectively. As will be described in greater detail in the forthcoming paragraphs, a robotic system (not shown) mechanically engages the robotic gripper 2 to maneuver and operate the gripper 2 and manipulate target objects.

In a preferred embodiment of the present invention, the linear actuator 4 is configured as a pneumatic cylinder 10 that comprises a stationary air cylinder 12 and a linearly movable rod 14 coupled to a piston 15 situated within the bore 21 of the cylinder 12. However, it is also envisioned to be within the scope of the present invention to utilize other linear actuators depending on the level of control required. For example, air cylinders, hydraulic cylinders, servos and stepper actuators may also be utilized. Various linear actuators may be interchangeably utilized depending on the particular assembly system. For example, a linear actuator having a longer reach may be required for a particular task. Furthermore, the material of the rod can be varied in order to change the friction coefficient and particle shedding properties. The stationary air cylinder 12, which has a first axial end 16, a second axial end 18 disposed opposite the first axial end 16 and a housing 20 extending therebetween, includes an internal bore 21 in which the rod 14 and piston 15 are situated. The rod 14, which includes a first axial end 23 and an oppositely disposed second axial end 25, is selectively reciprocatingly movable within the internal bore 21 of the air cylinder 12, at least partially along the axial length thereof. A mounting flange 26 that is engageable with a connection fitting of the robotic system (not shown) is situated on the first axial end 16 of the pneumatic cylinder 10.

The stationary air cylinder 12 includes at least a first air connection 22 and a second air connection 24. Each air connection 22, 24 is preferably formed as an opening that extends through the air cylinder housing 20 into the internal bore 21 thereof. Preferably, the first air connection 22 is situated in proximity to the first axial end 16 of the air cylinder 12, and the second air connection 24 is situated in proximity to the second axial end 18 of the air cylinder 12. A pneumatic air source (not shown) is connected to each of the air connections 22, 24 to drive the rod 14, coupled to the piston 15, in a particular direction. For example, application of pneumatic pressure through the first air connection 22 may drive the rod 14 and piston 15 axially towards the second axial end 18 of the air cylinder 12 (i.e., a downward stroke). Similarly, application of pneumatic pressure through the second air connection 24 may drive the rod 14 and piston 15 axially towards the first axial end 16 of the air cylinder 12 (i.e., an upward stroke). As can be seen in FIGS. 4 and 5 of the drawings, the application of pneumatic pressure to the first air connection 22 can drive the rod 14 to at least partially protrude through an opening formed in the second axial end 18 of the air cylinder 12.

The gripping assembly 6 is situated in proximity to the second axial end 18 of the air cylinder 12. The gripping assembly 6 comprises a finger holder 28, which holds the plurality of resilient fingers 8, and a finger closer 30. As will be explained in greater detail, the finger holder 28 remains stationary and is mechanically coupled to a stationary portion of the pneumatic cylinder 10. The finger closer 30 is mechanically coupled to the linearly movable rod 14 and is reciprocatingly movable with respect to the finger holder 28 and pneumatic cylinder 10. The fingers 8 are formed into a shape that gives users the spread that they desire when the finger closer 30 is retracted (e.g., when the gripper 2 is in the open position). When the finger closer 30 is retracted (e.g., when the gripper 2 is in the open position), the formed resilient fingers 8 take the shape that the fingers 8 were originally formed to.

As can be seen in FIGS. 1 and 3-5 of the drawings, the finger holder 28 is preferably formed as a generally cylindrical member 32 having a first axial end 34, a second axial end 36 disposed opposite the first axial end and a side wall 37 extending therebetween. The cylindrical member 32 includes an internal bore 33 that extends along the axial length thereof, which bore 33 is in axial alignment with the bore 21 and piston rod 14 of the air cylinder 12. As will be explained in greater detail in the forthcoming paragraphs, the second axial end 25 of the rod 14 extends through the internal bore 33 of the cylindrical member 32 and at least partially protrudes from the second axial end 36 thereof. The portion of the rod 14 that protrudes through the second axial end 36 of the cylindrical member 32 is coupled to the finger closer 30. As can be seen in FIGS. 1 and 3-5 of the drawings, the finger closer 30 is also preferably formed as a generally cylindrical member 38 having a top surface 40, a bottom surface 42 situated opposite the top surface 40 and a side wall 44 extending therebetween. A plurality of circumferentially spaced apart openings 47 are formed axially through the thickness of the finger closer 30 through which the resilient fingers 8 extend.

Figure 6:
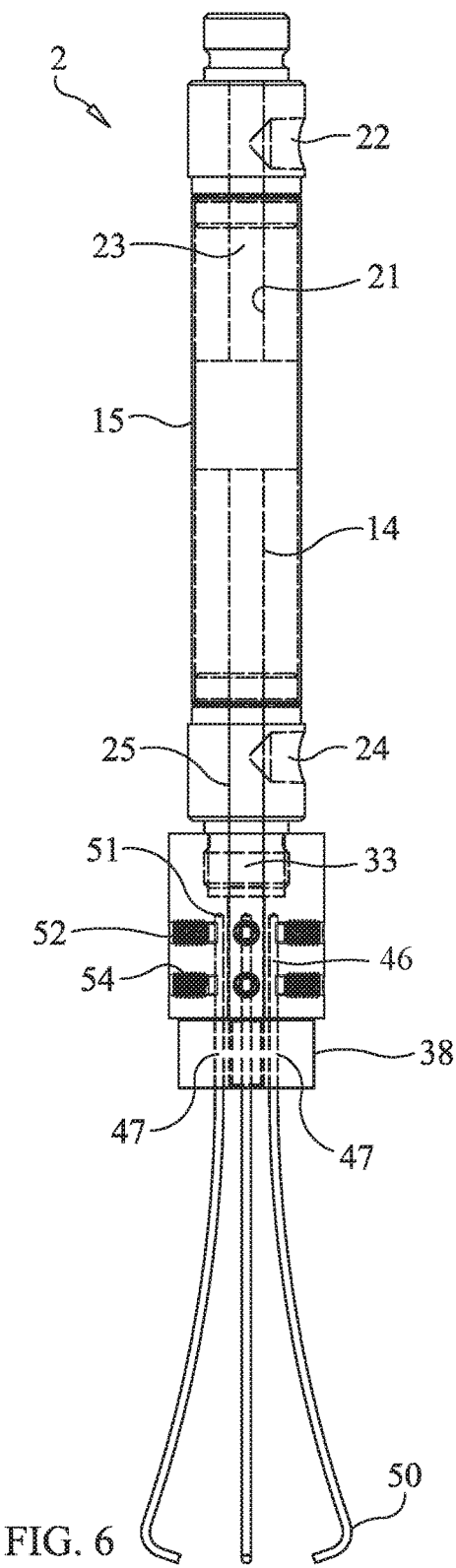
FIG. 6 is a longitudinal partial cross-sectional view of the robotic gripper formed in accordance with the present invention, showing the gripper in the open position.

The cylindrical member 32 forming the finger holder 28 further includes a plurality of spaced apart, axial channels 46 formed circumferentially around the internal bore 33, as can be seen in FIG. 6 of the drawings. Each channel 46 preferably extends inwardly along the axial length of the cylindrical member 32 from the second axial end 36 at least partially into the body thereof. As will be described in greater detail, the channels 46 receive portions of the resilient fingers 8 that grasp and release the target objects.

As can be seen in FIG. 6 of the drawings, each resilient finger 8 includes a first axial end 51 and an oppositely disposed second axial end 50. The first axial end 51 of each resilient finger 8 preferably extends through one of the openings 47 in the finger closer 30 and is received within an aligned channel 46 in the cylindrical member 32 of the finger holder 28. The resilient fingers 8 are affixed within the channels 46 by a plurality of engagement screws 52 that are threaded through a plurality of threaded openings 54 extending radially and circumferentially arranged around the cylindrical member 32. Preferably, there are two axially-spaced threaded openings 54 and two engagement screws 52 situated in radial alignment and engagement with the first axial end portion 51 of a respective one of the plurality of fingers 8. Each opening 54 extends through the side wall 37 of the cylindrical member 32 into the channels 46 where the first axial ends 51 of the resilient fingers 8 are situated. The screws 52 are preferably threaded into the openings 54 and secure the first axial ends 51 of the resilient fingers 8 within the channels 46. The resilient fingers 8 are preferably outwardly curved and biased. The second axial ends 50 of the resilient fingers 8 are preferably inwardly angulated to form hooks so that when the gripper 2 is in a closed position, the second axial ends 50 of the fingers 8 grasp the target object, as will be explained in the forthcoming paragraphs.

To grasp the target object, the robotic system aligns the gripper 2 with the target object and the gripping assembly 6 is configured to be in the open position. More specifically, to grasp a target object, pneumatic pressure is applied to the second air connection 24 which drives the cylinder rod 14 and piston 15 upwardly through the internal bore 21 of the air cylinder 12 towards the first axial end 16 thereof. As can be seen in FIGS. 1, 3 and 6 of the drawings, in the open position, the finger closer 30, attached to the second axial end 25 of the rod 14, is in proximity to the second axial end 36 of the finger holder 28, and the second axial ends 50 of diametrically opposed resilient fingers 8 are spaced apart by a spread distance 56 so that the target object may be positioned therein. Once the target object is within the relatively larger target object open area defined by the spaced apart resilient fingers 8, the gripper 2 is then configured to be in the closed position.

More specifically, to configure the gripper 2 to be in the closed position, wherein the resilient fingers 8 are biased inwardly by the finger closer 30 so as to grasp the target object, pneumatic pressure is applied to the first air connection 22. As pneumatic pressure is applied to the first air connection 22, the cylindrical rod 14 and piston 15 are driven downwardly through the internal bore 21 of the air cylinder 12. As the rod 14 is driven downwardly, the finger closer 30 coupled thereto slides over the resilient fingers 8 situated within the openings 47 in the cylindrical body 38 of the finger closer 30, thereby pulling the resilient fingers 8 radially inwardly, against the bias of the fingers 8. As the fingers 8 are pulled inwardly by the finger closer 30, the distance 56 between their angulated second axial ends 50 decreases so that the resilient fingers 8 grasp the target object. Once the target object is secured within the relatively smaller target object closed area defined by the now closed second axial ends 50 of the resilient fingers 8, the gripper 2 is maneuvered by the robotic assembly to a desired destination location and is again configured to be in the open position, thereby releasing the target object from the resilient fingers 8.

Advantageously, the fingers 8 move horizontally, as opposed to vertically, which allows for more accurate placement of the tooling. Furthermore, the spread of the fingers can be adjusted by the way that the wire fingers 8 are formed. The gripper 2 may also accommodate wire fingers 8 of varying thicknesses. For example, wire fingers 8 having an increased thickness may be utilized to give the gripper 2 a stronger grip on the target object or to grab heavy objects. As mentioned previously, the finger holder 28 has a plurality of channels 46 and the finger closer 30 has a plurality of openings 47 so that the number, strength, spread, thickness, length and other parameters of the wire fingers 8 utilized can easily be adjusted by the user by choosing different interchangeable fingers 8 in order to change the surface area that the gripper 2 is grabbing or provide the gripper 2 with the capabilities required for a given task. It is also envisioned to be within the scope of the present invention to mount the robotic gripper 2 in a variety of orientations and configurations to accomplished various tasks, depending on the particular needs of the assembly system. Also, although the cylinder 12 is described herein as an air cylinder, cylinder 12 may be a hydraulic cylinder connected to a hydraulic fluid source to reciprocatingly drive the rod 14 and piston 15.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A robotic gripper for grasping a target object, the robotic gripper being mechanically engageable with a robotic system that maneuvers and operates the robotic gripper, the robotic gripper comprising:
   a linear actuator; and
   a gripping assembly mechanically coupled to the linear actuator;
   wherein the gripping assembly includes a plurality of fingers, each finger having a first axial end and an oppositely disposed second axial end;
   wherein the gripping assembly is selectively adjustable between a first position and a second position, wherein in the first position, the fingers are inwardly biased towards the target object, and wherein in the second position, the fingers are outwardly biased away from the target object;
   wherein the linear actuator includes:
   a fluid cylinder having a first axial end, a second axial end disposed opposite the first axial end and an internal bore extending at least partially along the axial length thereof;
   a linearly movable rod situated within the internal bore of the fluid cylinder, the linearly movable rod having a first axial end and a second axial end disposed opposite the first axial end;
   a piston mechanically coupled to the linearly movable rod, the piston being situated at least partially within the internal bore of the fluid cylinder; and
   a first fluid connection and a second fluid connection, the first fluid connection and the second fluid connection being in fluid communication with the internal bore of the fluid cylinder and being connectable to a source of pressurized fluid;
   wherein the linearly movable rod is reciprocatingly movable within the internal bore of the fluid cylinder between a retracted position and an extended position, wherein when pressurized fluid is applied to the first fluid connection, the linearly movable rod moves axially in a direction towards the second axial end of the fluid cylinder to the extended position, and when pressurized fluid is applied to the second fluid connection, the linearly movable rod moves axially in a direction towards the first axial end of the fluid cylinder to the retracted position;
   wherein the gripping assembly further includes:
   a finger holder mechanically coupled to the fluid cylinder in proximity to the second axial end thereof, wherein the first axial ends of the plurality of fingers are affixed to the finger holder; and
   a finger closer, the finger closer being mechanically coupled to the second axial end of the linearly movable rod, the finger closer including a main body portion having a first axial end, a second axial end disposed opposite the first axial end and a plurality of openings formed axially through the thickness thereof;
   wherein the fingers extend from the finger holder through respective openings formed in the main body of the finger closer;
   wherein the finger closer is reciprocatingly slidable on the plurality of fingers extending through the openings formed therein;
   wherein the axial movement of the linearly movable rod and finger closer mechanically coupled thereto from the retracted position to the extended position biases the second axial ends of the fingers inwardly towards the target object; and
   wherein the axial movement of the linearly movable rod and finger closer mechanically coupled thereto from the extended position to the retracted position causes the second axial ends of the fingers to outwardly expand away from the target object.

2. A robotic gripper as defined by claim 1, wherein the fingers are resilient and biased radially away from the target object;
   wherein the finger closer pulls the fingers towards the target object, against the bias of the resiliency of the fingers, as the linearly movable rod is moved from the retracted position to the extended position to grasp the target object; and
   wherein the resiliency and radially outward bias of the fingers cause the second axial ends thereof to move away from the target object as the linearly movable rod and finger closer mechanically coupled thereto are moved from the extended position to the retracted position.

3. A robotic gripper as defined by claim 2, wherein at least a portion of each finger is radially outwardly angulated.

4. A robotic gripper as defined by claim 1, wherein the finger holder includes a main body having a first axial end, a second axial end disposed opposite the first axial end and an internal bore extending therethrough;
   wherein the internal bore of the finger holder is in axial alignment with the internal bore of the fluid cylinder; and
   wherein the linearly movable rod is reciprocatingly movable within the internal bore of the fluid cylinder and the internal bore of the finger holder.

5. A robotic gripper as defined by claim 4, wherein the finger holder further has a plurality of axial channels formed circumferentially around the internal bore thereof, the channels extending through the second axial end of the main body of the finger holder and at least partially axially into the main body; and wherein the first axial ends of the fingers are received within the channels of the main body of the finger holder.

6. A robotic gripper as defined by claim 5, wherein the finger holder further includes:

a plurality of threaded bores, each threaded bore extending transversely at least partially through the main body of the finger holder and into a respective one of the channels; and a plurality of threaded engagement screws, each threaded engagement screw being receivable by a respective one of the threaded bores and being in threading engagement therewith;

wherein each threaded engagement screw is rotatable and rotation of the threaded engagement screw causes the engagement screw to exert a holding force on a respective one of the fingers to secure the respective finger to the finger holder within a corresponding one of the channels.

7. A robotic gripper as defined by claim 1, wherein one or more of the fingers of the gripping assembly are removable from the gripping assembly and replaceable with a finger having different characteristics from those of the removed finger.

8. A robotic gripper as defined by claim 1, wherein the first fluid connection is situated in proximity to the first axial end of fluid cylinder and the second fluid connection is situated in proximity to the second axial end of the fluid cylinder.

9. A robotic gripper as defined by claim 1, wherein, in the extended position, the linearly movable rod protrudes at least partially from the second axial end of the fluid cylinder.

10. A robotic gripper as defined by claim 1, wherein the fluid cylinder is one of a pneumatic cylinder and a hydraulic cylinder.

11. A robotic gripper as defined by claim 1, wherein the second axial end of each finger includes a hooked portion.

12. A robotic gripper as defined by claim 1, wherein the linear actuator further includes a first axial end and an oppositely disposed second axial end, the gripping assembly being situated at the second axial end thereof; and wherein the robotic gripper further comprises a mounting flange, the mounting flange being mechanically coupled to the linear actuator and situated at the first axial end thereof.

13. A robotic gripper as defined by claim 1, wherein the fingers of the plurality of fingers are arranged to define a target object closed area when the gripping assembly is in the first position, and to define a target object open area when the gripping assembly is in the second position, the target object open area being greater than the target object closed area.

* * * * *